(12) United States Patent
Achtermann et al.

(10) Patent No.: US 8,099,454 B2
(45) Date of Patent: Jan. 17, 2012

(54) STAGING A FILE WITHIN A DISTRIBUTED COMPUTING SYSTEM

(75) Inventors: Jeffrey M. Achtermann, Austin, TX (US); Todd Gerlach, Austin, TX (US); Terence J. Quinn, Austin, TX (US); Patrick L. Woods, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 794 days.

(21) Appl. No.: 11/833,583

(22) Filed: Aug. 3, 2007

(65) Prior Publication Data

US 2009/0037428 A1 Feb. 5, 2009

(51) Int. Cl.
*G06F 15/16* (2006.01)
*G06F 15/173* (2006.01)

(52) U.S. Cl. .................................. 709/203; 709/226
(58) Field of Classification Search .................. 709/213, 709/203, 226
See application file for complete search history.

(56) References Cited

U.S. PATENT DOCUMENTS

| | | | |
|---|---|---|---|
| 6,304,913 B1 * | 10/2001 | Rune | 709/241 |
| 6,526,478 B1 * | 2/2003 | Kirby | 711/114 |
| 6,847,984 B1 | 1/2005 | Midgley et al. | |
| 6,947,992 B1 | 9/2005 | Shachor | |
| 7,120,757 B2 | 10/2006 | Tsuge | |
| 7,143,085 B2 | 11/2006 | Brown et al. | |
| 2002/0046232 A1 | 4/2002 | Adams et al. | |
| 2002/0169890 A1 * | 11/2002 | Beaumont et al. | 709/245 |
| 2003/0191816 A1 * | 10/2003 | Landress et al. | 709/219 |
| 2005/0021725 A1 | 1/2005 | Lobbert | |
| 2006/0117038 A1 * | 6/2006 | Toebes et al. | 707/100 |
| 2006/0143703 A1 * | 6/2006 | Hopen et al. | 726/15 |
| 2006/0212552 A1 * | 9/2006 | Cheshire | 709/220 |
| 2006/0253852 A1 * | 11/2006 | Honda et al. | 717/177 |
| 2006/0268319 A1 * | 11/2006 | Winkel et al. | 358/1.15 |

FOREIGN PATENT DOCUMENTS

| | | | |
|---|---|---|---|
| JP | 06110080 A | 4/1994 |
| JP | 2005115685 A | 4/2005 |
| JP | 2006350599 A | 12/2006 |

* cited by examiner

*Primary Examiner* — Karen Tang
*Assistant Examiner* — Steven Nguyen
(74) *Attorney, Agent, or Firm* — Stephen J. Walder, Jr.; Jeffrey S. LaBaw (57) ABSTRACT

Methods, apparatus, and products for staging a file within a distributed computing system are disclosed that include defining a topology of the network; mapping each computer to a network location in the topology of the network; selecting, in dependence upon the topology of the network and the network locations of the computers in the network, one or more servers on which to stage the file for use by clients in the network; and staging the file on the one or more selected servers. The distributed computing system includes a plurality of computers coupled for data communications through a data communications network, the distributed computing system also includes files of computer data and computer program instructions for use by the computers, the computers include clients that use the files and servers capable of functioning as staging locations for files for use by the computers in the network.

20 Claims, 6 Drawing Sheets

STAGING A FILE WITHIN A DISTRIBUTED COMPUTING SYSTEM

BACKGROUND OF THE INVENTION

1. Field of the Invention

The field of the invention is data processing, or, more specifically, methods, apparatus, and products for staging a file within a distributed computing system.

2. Description Of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One of the areas in which progress has been made is in distributed computing systems. Distributed computing systems may include a large number of computers at varying network locations. From time to time files must be downloaded to all or some of the computers that make up the distributed computing system. Files that are downloaded by multiple computers in the distributed computing system are typically cached on file servers or applications for later download by the computers. Currently, system administrators stage files in specific servers within a distributed computing system manually. The staging of files in this manner may include administrators attempting to guess which servers would be best to populate with the files. Alternatively administrators may choose to stage files on all available servers. Either manner of staging the files is inefficient; one manner includes a manual choice of file servers that may or may not be the best choice while the other manner includes over-deployment of the files to many servers that be used only be a few computers. Currently, there is no automated method of staging a file in a distributed computing system that takes into account the identification of the clients that will be downloading the file; the network location of each client that will be downloading the file; the network location of each server; and the number of clients that will be downloading the file from each server.

SUMMARY OF THE INVENTION

Methods, apparatus, and products for staging a file within a distributed computing system are disclosed that include defining a topology of the network; mapping each computer to a network location in the topology of the network; selecting, in dependence upon the topology of the network and the network locations of the computers in the network, one or more servers on which to stage the file for use by clients in the network; and staging the file on the one or more selected servers. The distributed computing system includes a plurality of computers coupled for data communications through a data communications network, the distributed computing system also includes files of computer data and computer program instructions for use by the computers, the computers include clients that use the files and servers capable of functioning as staging locations for files for use by the computers in the network. The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
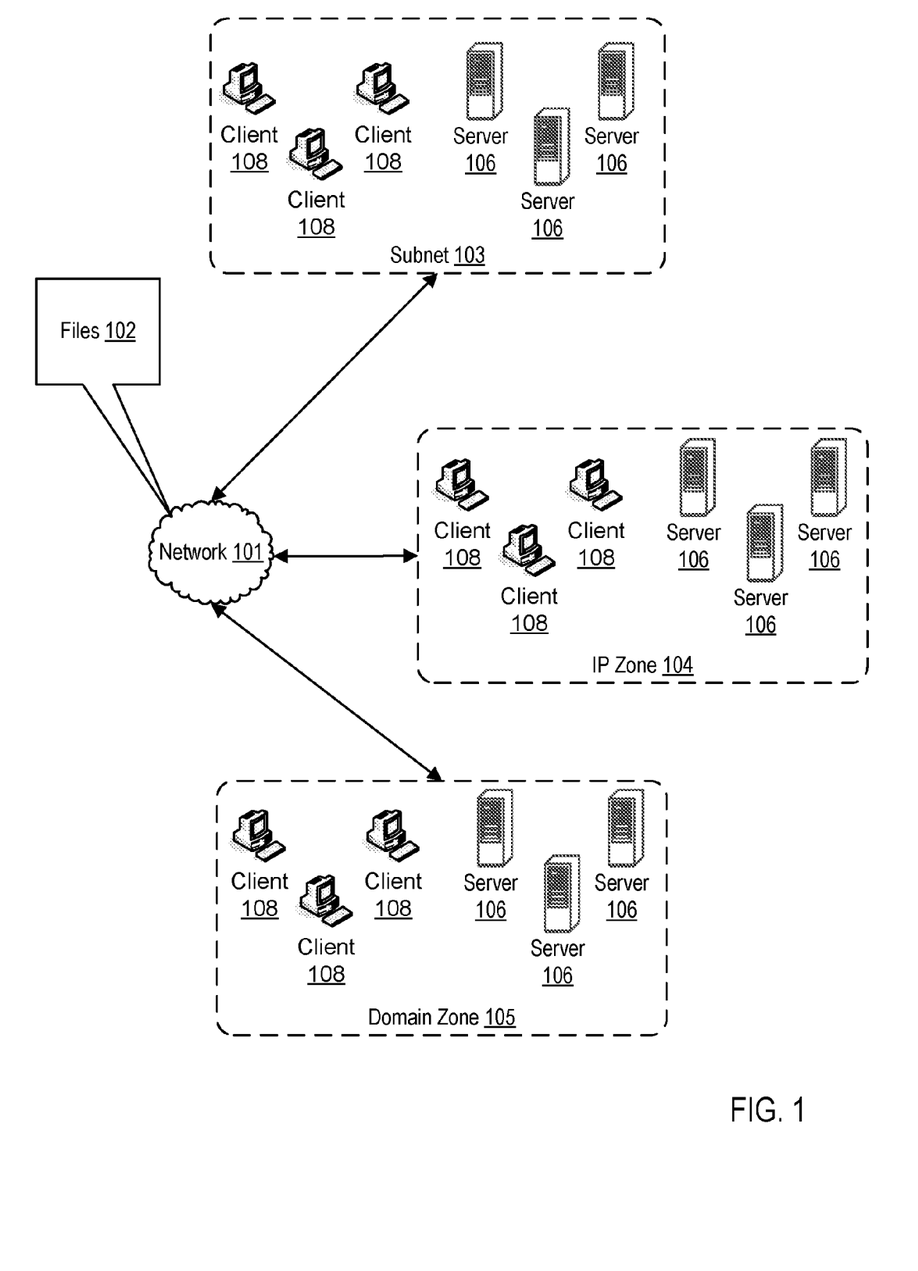
FIG. 1 sets forth a network diagram of an exemplary system for staging a file within a distributed computing system according to embodiments of the present invention.

Exemplary methods, apparatus, and products for staging a file within a distributed computing system in accordance with the present invention are described with reference to the accompanying drawings, beginning with FIG. 1. FIG. 1 sets forth a network diagram of a system for staging a file within a distributed computing system according to embodiments of the present invention. The distributed computing system of FIG. 1 includes a plurality of computers (106, 108) coupled for data communications through a data communications network (101). The distributed computing system also includes files (102) of computer data and computer program instructions for use by the computers. A file is a block of arbitrary information, or resource for storing information, that is available to a computer program. A file may include for example, a document, a spreadsheet, firmware, application program or others as will occur to those of skill in the art. In the system of FIG. 1, the computers include clients (108) that use the files (102) and servers (108) capable of functioning as staging locations for files (102) for use by the computers in the network (101). A computer is any automated computing machinery that manipulates data according to a list of instructions, computer program instructions. The term 'server' as used in this specification refers to a computer that operates according to computer program instructions capable of transmitting a file to another computer. The term 'client' as used in this specification refers to a computer that operates according to computer program instructions capable of receiving a file from a server. That is, servers according to embodiments of the present invention, transmit files to clients.

The system of FIG. 1 stages a file according to embodiments of the present invention by defining a topology of the network (101); mapping each computer (106, 108) to a network location in the topology of the network; selecting, in dependence upon the topology of the network and the network locations of the computers in the network, one or more servers on which to stage the file for use by clients in the network; and staging the file on the one or more selected servers.

Defining (402) a topology (410) of the network (101) according to the embodiments of the present invention may be carried out by specifying a hierarchy among a subnet (103), an IP zone (104), a domain name, a domain zone (105), and a region of the network (101). A subnet (103) is a range of logical addresses within the address space that is assigned to the network (101), called the domain. The subnet is typically served by only one router.

An IP zone (104) comprises a contiguous range of IP addresses, similar to a subnet. Unlike a subnet (103), however, an IP zone (104) is not automatically specified but is manually configured by a network administrator. The IP zone may be specified such that all computers and servers in the system of FIG. 1 are included in the IP zone. In the alternative the IP zone may be specified such that only a subset of the computers and servers in the network are included in the IP zone. An IP zone may include computers that are part of separate subnets.

A domain name such as, for example, austin.ibm.com, is automatically specified for computers in the network that are a part of the same domain. A domain name may include computers that are part of separate IP zones and separate subnets. A domain zone (105) is characterized by a domain zone name, similar to a domain name, that is manually configured. A domain zone name is typically a portion of a domain name that is included in many different domain names. A domain zone therefore may include many different domain names. Consider for example the domain zone characterized by a domain zone name, ibm.com. Such a domain zone includes many domain names such as austin.ibm.com, raleigh.ibm.com, bladeservers.ibm.com, and so on. A domain zone may include computers that are part of separate domain names, separate IP zones, and separate subnets.

A region in the network is specified as a subset of IP zones (104), a subset of domain zones (105), or both. A region is specified according to physical locations of the computers in IP zones or domain zones. That is, computers and servers that are physically located closer to one another may be included in the same region. If three subnets are located in Austin, Tex., for example, while three other subnets are located in China, the Austin subnets will be characterized as belonging to a particular region separate from the region that includes the subnets located in China.

The arrangement of servers, clients, and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Staging a file within a distributed computing system in accordance with the present invention is generally implemented with computers, that is, with automated computing machinery. In the system of FIG. 1, for example, all the clients and servers are implemented to some extent at least as computers. For further explanation, therefore, FIG. 2 sets forth a block diagram of automated computing machinery comprising an exemplary computer (152) useful in staging a file within a distributed computing system according to embodiments of the present invention. The computer (152) of FIG. 2 includes at least one computer processor (156) or 'CPU' as well as random access memory (168) ('RAM') which is connected through a high speed memory bus (166) and bus adapter (158) to processor (156) and to other components of the computer (152).

Figure 2:
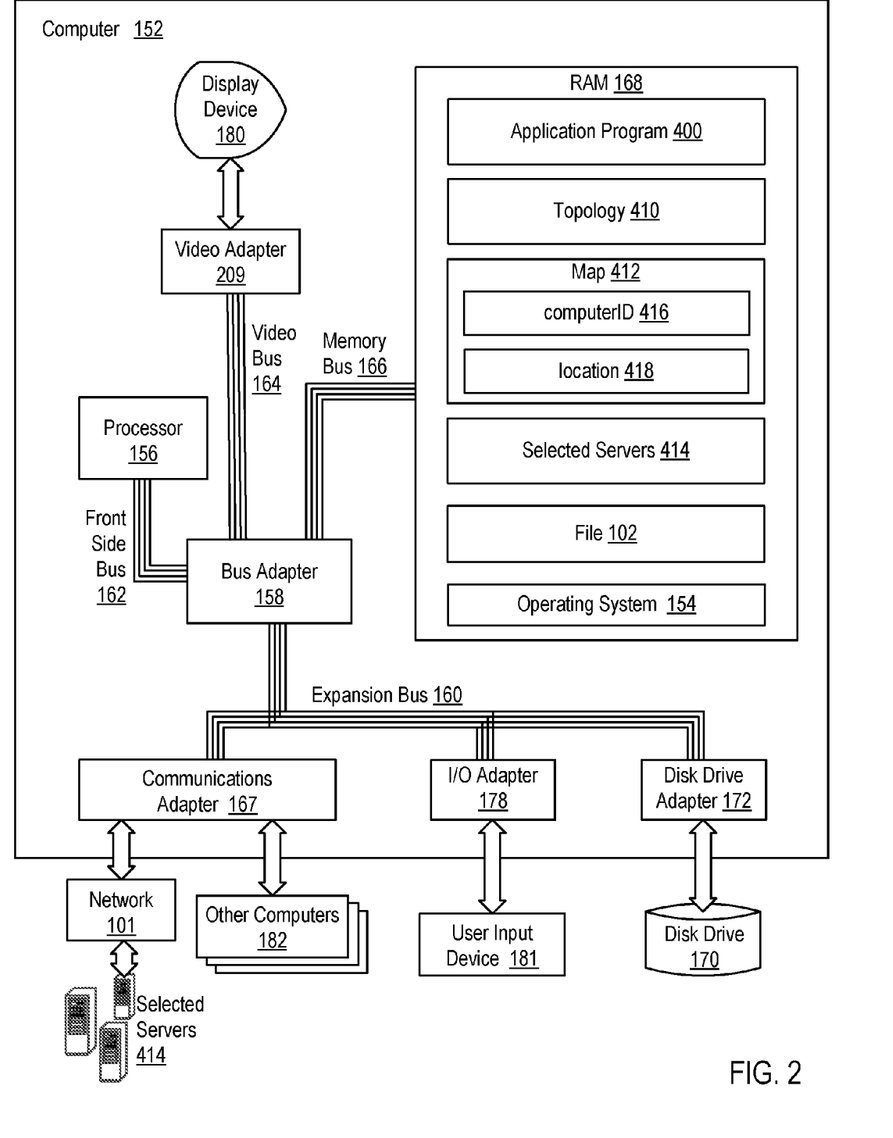
FIG. 2 sets forth a block diagram of automated computing machinery comprising an exemplary computer useful in staging a file within a distributed computing system according to embodiments of the present invention.

Stored in RAM (168) is an application program (400), a module of computer program instructions useful for staging a file within a distributed computing system according to embodiments of the present invention. The application program (400) is capable of defining a topology (410) of the network (101). A topology (410) of the network (101) specifies the boundaries of the different subnets, IP zones, domain names, domain zones, and regions in the network (101). The application program (400) is also capable of mapping each computer to a network location (418) in the topology of the network. The exemplary map (412) of FIG. 2 is a data structure that includes a computer identification (416) and a corresponding network location (418) for each computer in the network (101). The application program is also capable of selecting, in dependence upon the topology (410) of the network (101) and the network locations (418) of the computers in the network, one or more servers on which to stage the file (102) for use by clients in the network; and staging the file on the one or more selected servers (414).

Also stored in RAM (168) is an operating system (154). Operating systems useful for staging a file within a distributed computing system according to embodiments of the present invention include UNIX™, Linux™, Microsoft XP™, Microsoft Vista™, AIX™, IBM's i5/OS™, and others as will occur to those of skill in the art. The application program (400) and operating system (154) illustrated in FIG. 2 are shown in RAM (168), but many components of such software typically are stored in non-volatile memory also, such as, for example, on a disk drive (170).

The exemplary computer (152) of FIG. 2 includes bus adapter (158), a computer hardware component that contains drive electronics for high speed buses, the front side bus (162), the video bus (164), and the memory bus (166), as well as drive electronics for the slower expansion bus (160). Examples of bus adapters useful in computers useful according to embodiments of the present invention include the Intel Northbridge, the Intel Memory Controller Hub, the Intel Southbridge, and the Intel I/O Controller Hub. Examples of expansion buses useful in computers useful according to embodiments of the present invention may include Peripheral Component Interconnect ('PCI') buses and PCI Express ('PCIe') buses.

The computer (152) of FIG. 2 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for staging a file within a distributed computing system according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 2 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 2 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 2 includes a communications adapter (167) for data communications with other computers (182) and for data communications with a data communications network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for staging a file within a distributed computing system according to embodiments of the present invention include modems for wired dial-up communications, Ethernet (IEEE 802.3) adapters for wired data communications network communications, and 802.11 adapters for wireless data communications network communications.

Figure 3:
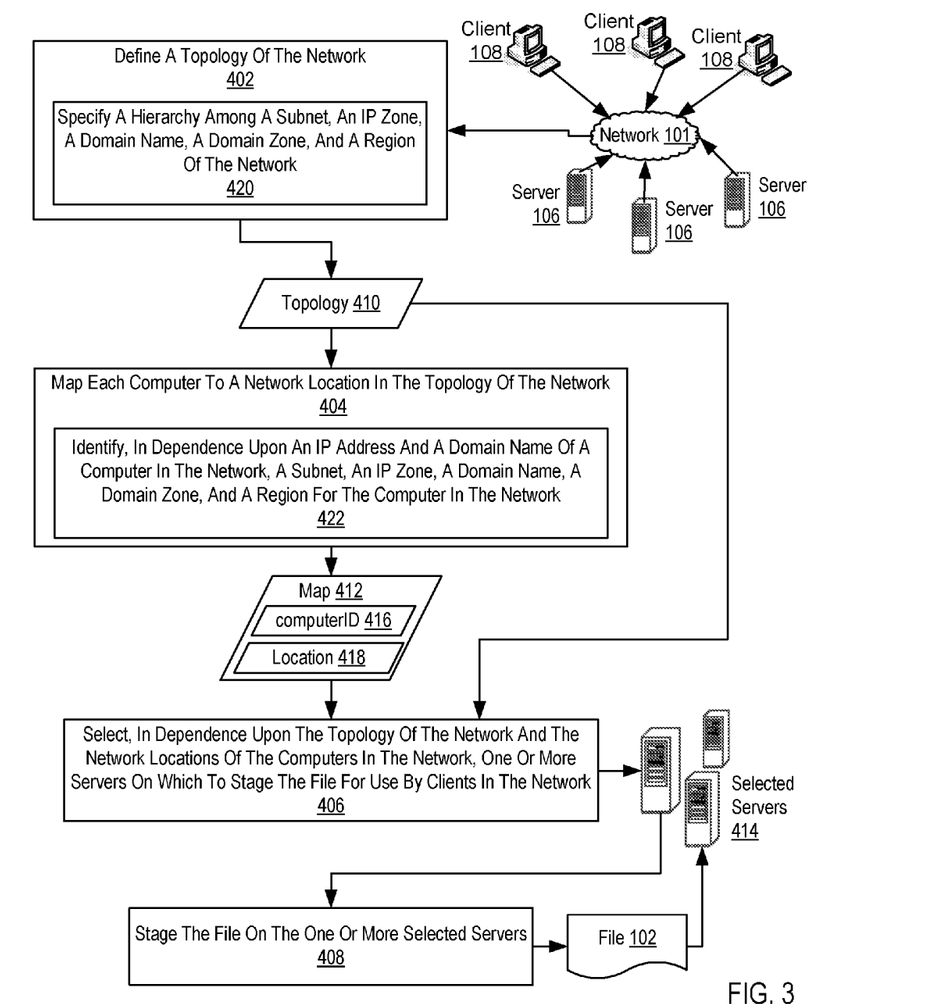
FIG. 3 sets forth a flow chart illustrating an exemplary method for staging a file within a distributed computing system according to embodiments of the present invention.

For further explanation, FIG. 3 sets forth a flow chart illustrating an exemplary method for staging a file within a distributed computing system according to embodiments of the present invention. The distributed computing system includes a plurality of computers coupled for data communications through a data communications network. The distributed computing system also includes files (102) of computer data and computer program instructions for use by the computers. The computers include clients (108) that use the files (102) and servers (106) capable of functioning as staging locations for files (102) for use by the computers in the network (101).

The method of FIG. 3 includes defining (402) a topology (410) of the network (101). In the method of FIG. 3, a topology (410) represents the logical and physical interconnections among all the computers in the network (101). The logical interconnections of the computers in the method of FIG. 3 are characterized according to network protocols such as, for example, the Internet Protocol (IP). Physical interconnections of the computers in the method of FIG. 3 may be characterized by, for example, the links and cables that each computer shares in connection with the rest of the computers in the network.

Defining (402) a topology (410) of the network (101) according to the method of FIG. 3 may be carried out by specifying (420) a hierarchy among a subnet (103), an IP zone (104), a domain name, a domain zone (105), and a region of the network (101). Specifying (420) a hierarchy includes setting the boundaries of any subnets (103), IP zones (104), domain names, domain zones (105), and regions in the network (101). The topology (410) in the example of FIG. 3 includes all existing subnets (103), IP zones (104), domain names, domain zones (105), and regions in the network (101).

In the method of FIG. 3, a subnet (103) is a range of logical addresses within the address space that is assigned to the network (101). The subnet is typically served by only one router. The boundary of a subnet (103) in the network is automatically specified by a subnet mask. IP addresses have two components, the network address and the host address. A subnet mask is a mask used to determine the subnet, the network address, to which an IP address belongs. A subnet mask consists of a series of 1s in binary followed by a series of 0s. The 1s designate the part of the IP address that is the host address, and the 0s designate the part of the IP address that is the network address. The subnet mask is used in conjunction with the IP address to determine which part of the IP address is the network address and which part is the host address.

In the method of FIG. 3, an IP zone (104) comprises a range of IP addresses in the network. Unlike the subnet (103) an IP zone (104) is not automatically specified but is manually configured to specify the IP zone's boundary by, for example, a network administrator. The IP zone may be specified such that all computers in the network are included in the IP zone. In the alternative the IP zone may be specified such that only a subset of the computers and servers in the network are included in the IP zone. An IP zone may include computers that part of separate subnets.

In the method of FIG. 3, a domain name such as, for example, austin.ibm.com, is automatically specified for computers in the network that are a part of the same domain. A domain name may include computers that part of separate IP Zones and separate subnets. A domain zone (105) is characterized by a domain zone name, similar to a domain name, that is manually configured. A domain zone name is typically a portion of a domain name that is included in many different domain names. A domain zone therefore may include many different domain names.

Consider for example the domain zone characterized by a domain zone name, ibm.com. Such a domain zone includes many domain names such as austin.ibm.com, raleigh.ibm.com, bladeservers.ibm.com, and so on. A domain zone may include computers that are part of separate domain names, separate IP zones, and separate subnets.

In the method of FIG. 3, a region in the network is specified as a subset of IP zones (104) or a subset of domain zones (105). A region is specified according to physical locations of the computers and in the network. That is, computers and servers that are physically located closer to one another may be included in the same region.

The method of FIG. 3 also includes mapping (404) each computer to a network location (418) in the topology (410) of the network (101). In the method of FIG. 3, mapping (404) each computer to a network location (418) in the topology (410) of the network (101) is carried out by identifying (422), in dependence upon an IP address and a domain name of a computer in the network (101), a subnet (103), an IP zone (104), a domain name, a domain zone (105), and a region for the computer in the network (101). Identifying (422) a network location (418) for each computer in the network (101) is carried out by obtaining the computer's IP address and domain name and matching them to a corresponding subnet (103), IP zone (104), domain name, domain zone (105), and region in the network (101) specified in the topology (410). If a computer is located behind a network address translation ('NAT') device the IP address obtained in identifying the network location of the computer is the IP address the NAT device, not the actual IP address of the computer behind the NAT device. The IP address of the NAT device, not the actual IP address of the computer, may be used to identify the network location of the computer when, for example, the NAT device is a Virtual Private Network ('VPN') or when the NAT device is a switch, router, or hub that connects multiple devices to the network. Such a router that connects multiple devices to the network may include, for example, a router utilized in a person's home.

The resulting map (412) in the example of FIG. 3 represents network locations for all computers in the network. That is, each entry in the map (412) represents one computer in the network and its corresponding network location (418). In the example of FIG. 3, the map (412) also includes a computer identification (416) which uniquely identifies each computer in the network. This computer identification (418) may be any identification that uniquely identifies each computer in the network, such as, for example, a Universally Unique Identifier ('UUID') or a Media Access Control ('MAC') address of the computer. The network location (418) associates each computer identification (416) with its corresponding subnet (103), IP zone (104), domain name, domain zone (105), and region in the network (101).

The method of FIG. 3 also includes selecting (406), in dependence upon the topology (410) of the network (101) and the network locations (418) of the computers in the network (101), one or more servers (106) on which to stage the file (102) for use by the clients (108) in the network (101). In the method of FIG. 3, selecting (406), in dependence upon the topology (410) of the network (101) and the network locations (418) of the computers in the network (101), one or more servers (106) on which to stage the file (102) for use by the clients (108) in the network (101) may be carried out by identifying, for each client (108) that will use the file (102), a closest server within the topology (410) of the network (101), counting the number of times that each identified closest server is identified as a closest server for any client (108) that will use the file (102), selecting for staging of the file (102) one or more servers (106) identified as the closest server, excluding from the identified closest servers any server having a count less than a predetermined minimum threshold count, and for each identified closest server having a count greater than a predetermined maximum threshold count, identifying, for at least some of the clients that will use the file, an additional closest server within the topology of the network.

The method of FIG. 3 also includes staging (408) the file (102) on the one or more selected servers (414). The selected servers (414) include servers identified as closest servers to clients that will use the file and servers that meet the minimum and maximum predetermined thresholds for the number of clients of each selected server. When the servers are selected, the file (102) is copied to these selected servers (414) for later download by the clients (108) that will use the file (102).

Figure 4:
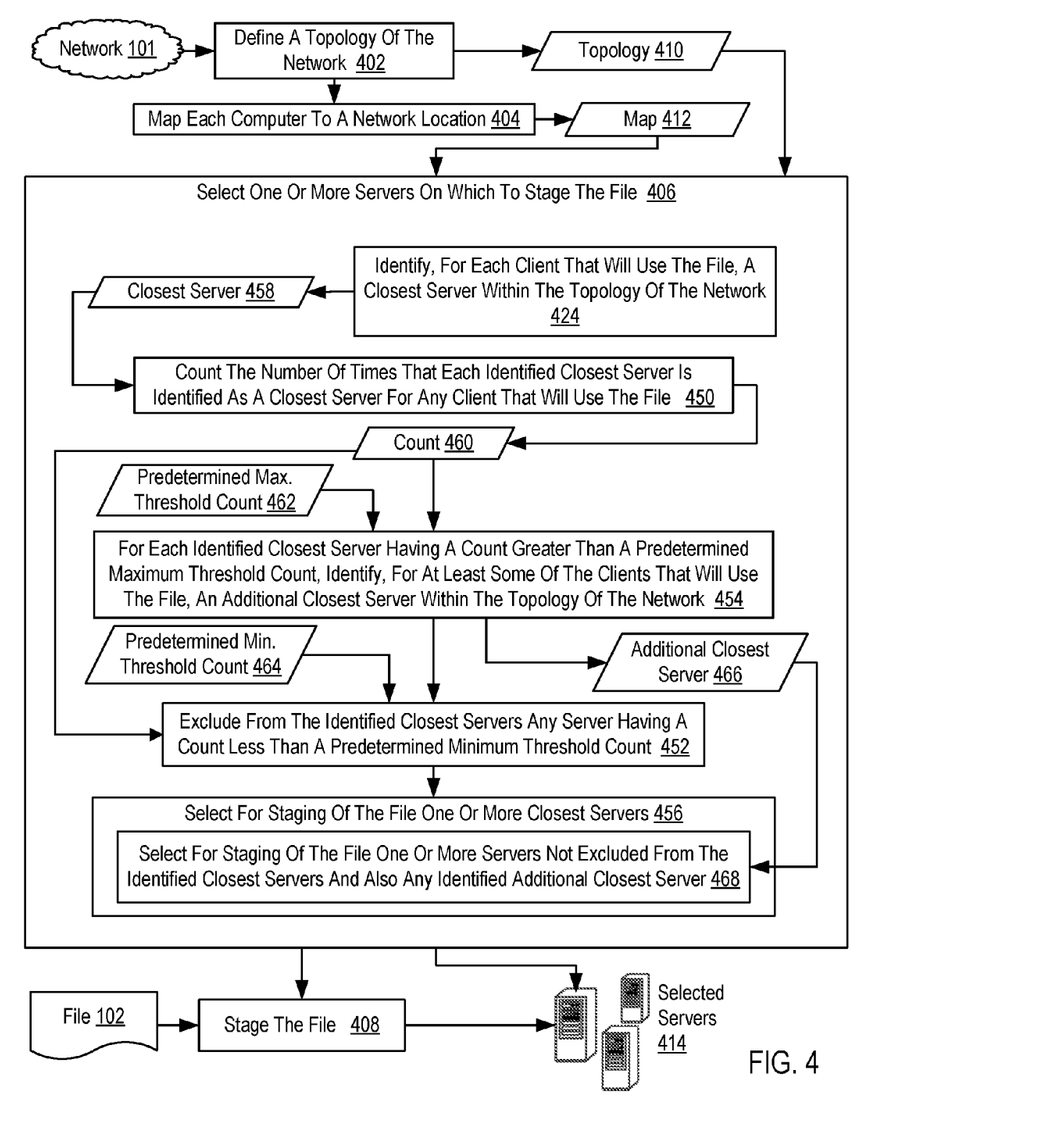
FIG. 4 sets forth a flow chart illustrating a further exemplary method for staging a file within a distributed computing system according to embodiments of the present invention.

For further explanation, FIG. 4 sets forth a flow chart illustrating a further exemplary method for staging a file within a distributed computing system according to embodiments of the present invention. The method of FIG. 4 is similar to the method of FIG. 3, including as it does, defining (402) a topology (410) of the network (101), mapping (404) each computer to a network location (418) in the topology (410) of the network (101), selecting (406) one or more servers on which to stage the file (102) for use by clients in the network (101), and staging (408) the file (102) on the one or more selected servers (414).

In the method of FIG. 4, however, selecting (406) one or more servers on which to stage the file (102) for use by clients in the network (101) includes identifying (424), for each client that will use the file (102), a closest server within the topology (410) of the network (101) and counting (450) the number of times that each identified closest server is identified as a closest server for any client (108) that will use the file (102). That is, a count (460) for each server is incremented when the server is identified as a closest server for a client that will use the file (102).

The method of FIG. 4 also includes for each identified closest server (458) having a count (460) greater than a predetermined maximum threshold count (462), identifying (454), for at least some of the clients that will use the file (102), an additional closest server (466) within the topology of the network. Identifying (456) an additional closest server for at least some of the clients (108) that will use the file (102) enhances efficiency of staging a file within a distributed computing system by preventing a file request overload on any one particular server.

The method of FIG. 4 also includes excluding (452) from the identified closest servers (458) any server having a count (460) less than a predetermined minimum threshold count (464). Excluding (454) an identified closest server (458) with a count (460) equal to or less than the predetermined minimum threshold count (462) enhances efficiency by preventing the staging of a file in a server where a low number of clients will download the file. The closest servers (458) having a count (460) equal to or less than the predetermined minimum threshold (464) count are excluded from the servers available for staging (408) of the file (102) and, for each client corresponding to the excluded servers, a server one level higher in the hierarchy of the network topology is identified and counted.

The method of FIG. 4 also includes selecting (452) for staging of the file (102) one or more of the closest servers (458). In the method of FIG. 4, selecting (452) for staging of the file (102) one or more of the closest servers (458) is carried out by selecting (468) for staging of the file (102) one or more servers not excluded (452) from the identified closest servers (458) and also any identified additional closest servers (466).

In the method of FIG. 4, as mentioned above, selecting (406) one or more servers on which to stage the file (102) for use by clients in the network (101) includes identifying (424), for each client that will use the file (102), a closest server within the topology (410) of the network (101). For further explanation, therefore, FIG. 5 sets forth a flow chart illustrating an exemplary method of identifying (424) a closest server within the topology of the network according to embodiments of the present invention. The method of FIG. 5 includes identifying (436), if there is a server in the same subnet with the client, the server in the same subnet; if there is no server in the same subnet with the client and if there is a server in the same IP zone with the client, identifying (438) the server in the same IP zone with the client; if there is no server in the same IP Zone with the client and if there is a server with the same domain name as the client, identifying (440) the server with the same domain name as the client; if there is no server with the same domain name as the client and if there is a server in the same domain zone with the client, identifying (440) the server in the same domain zone with the client; if there is no server in the same domain zone with the client and if there is a server in the same region with the client, identifying (442) the server in the same region with the client; and if there is no server in the same subnet, IP zone, domain name, domain zone, or region with the client, identifying (446) a server at random.

Figure 5:
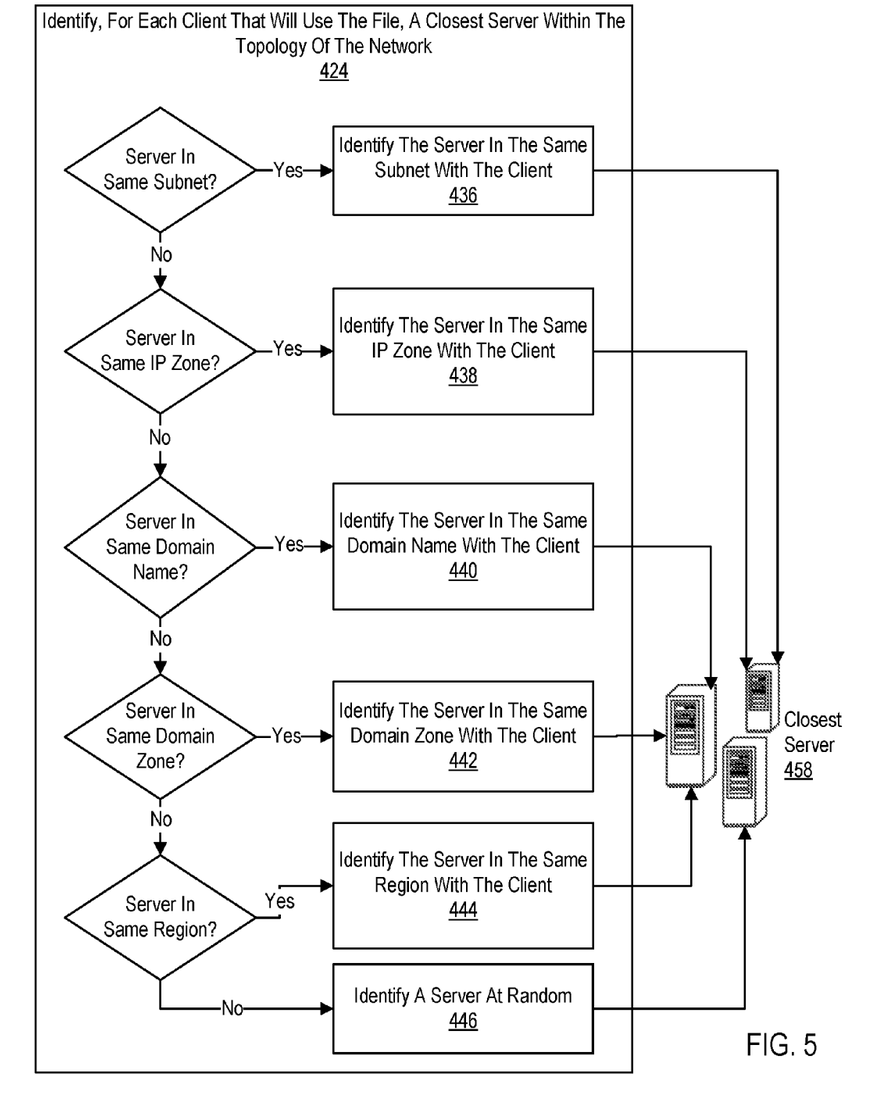
FIG. 5 sets forth a flow chart illustrating an exemplary method of identifying a closest server within the topology of the network according to embodiments of the present invention.

Any of the identified closest servers (458) must have enough free storage space in which to store the file (102). If multiple servers are located within a subnet, IP zone, domain name, domain zone, or region, any server within that subnet, IP zone, domain name, domain zone, or region is identified at random for the client. If there are multiple servers in the same subnet with a client, for example, any one of the servers may be identified at random as a closest server for that client. When a particular server is identified as a closest server (458), it will continue to be selected as a closest server for any additional clients in the same subnet, IP zone, domain name, domain zone, or region unless the closest server (458) has reached a predetermined maximum count as discussed above with respect to FIG. 4.

Figure 6:
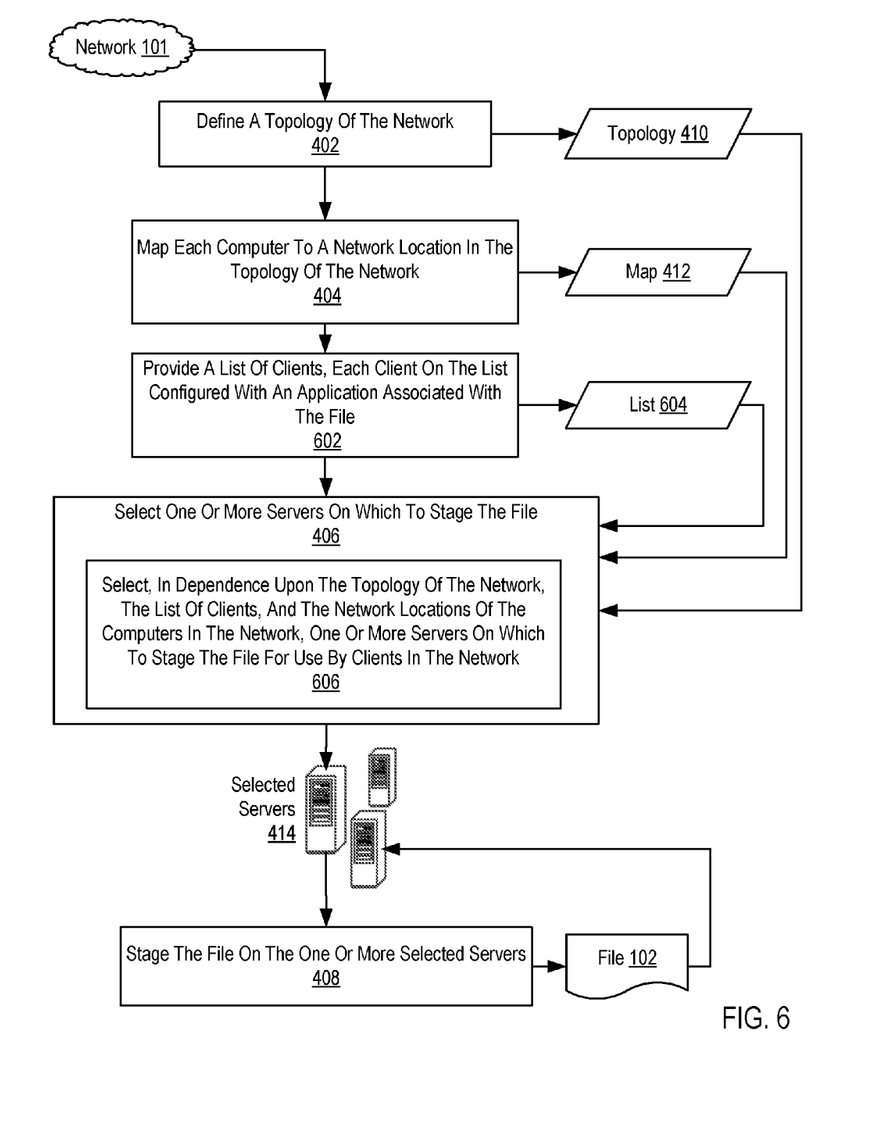
FIG. 6 sets forth a flow chart illustrating a further exemplary method for staging a file within a distributed computing system according to embodiments of the present invention.

For further explanation, FIG. 6 sets forth a flow chart illustrating a further exemplary method for staging a file within a distributed computing system according to embodiments of the present invention. The method of FIG. 6 is similar to the method of FIG. 3, including as it does, defining (402) a topology (410) of the network (101), mapping (404) each computer to a network location (418) in the topology (410) of the network (101), selecting (406) one or more servers on which to stage the file (102) for use by clients in the network (101), and staging (408) the file (102) on the one or more selected servers (414).

The method of FIG. 6, however, also includes providing (602) a list (604) of clients, each client on the list configured with an application associated with the file. Some applications, modules of computer program instructions, may from time to time require a particular file. Operating systems, for example, often require service packs and security patches. These files are application specific. Clients not configured with the application, then, have no need for the file and are largely ignored when selecting a server on which to stage such an application specific file. Consider for example, that only half the clients in a network are configured with the Windows XP™ operating system. When a security patch for Windows XP needs to be pushed to clients in the network, only half of the computers in the network would require the security patch. Staging the security patch on a server that serves few or no clients configured with the Windows XP operating system is inefficient.

In the method of FIG. 6, then, selecting (406), in dependence upon the topology (410) of the network (101) and the network locations of the computers in the network, one or more servers on which to stage the file for use by clients in the network is carried out by selecting (606), in dependence upon the topology (410) of the network, the list (604) of clients, and the network locations of the computers in the network, one or more servers (414) on which to stage the file for use by clients in the network. That is, servers upon which the application specific file is to be staged are selected in dependence the clients that require such an application specific file.

In view of the explanations set forth above, readers will recognize that the benefits of staging a file within a distributed computing system according to embodiments of the present invention include:

Saving administrators time by automatically selecting servers on which to stage a file.
Providing for scaling of networks by ensuring that the staged file will be copied to enough servers in order to handle a growing client load.
Reducing download time and network bandwidth consumption by staging the file physically near the clients that will download the file.

Exemplary embodiments of the present invention are described largely in the context of a fully functional computer system for staging a file within a distributed computing system. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A computer-implemented method of staging a file within a distributed computing system, the distributed computing system comprising a plurality of computers coupled for data communications through a data communications network, the distributed computing system further comprising files of computer data and computer program instructions for use by the computers, the computers comprising clients that use the files and servers capable of functioning as staging locations for files for use by the computers in the network, the method comprising:

defining a topology of the network, the topology including a network hierarchy;
mapping each computer to a network location in the topology of the network;
selecting, in dependence upon the topology of the network and the network locations of the computers in the network, one or more servers on which to stage the file for use by clients in the network; and
staging the file on the one or more selected servers, wherein selecting one or more servers on which to stage the file for use by clients in the network further comprises:
identifying, for each client, in a plurality of clients that will use the file, a closest server within the topology of the network;
counting a number of times that each identified closest server is identified as a closest server based on the plurality of clients that will use the file and the topology of the network; and
selecting, for staging of the file, one or more closest servers based on the count of the number of times each identified closest server is identified as a closest server for clients in the plurality of clients that will use the file, wherein closest servers having higher counts are selected as closest servers.

2. The method of claim 1 wherein defining a topology of the network further comprises:
specifying a hierarchy among a subnet, an IP zone, a domain name, a domain zone, and a region of the network.

3. The method of claim 1 wherein mapping each computer to a network location in the topology of the network further comprises:

identifying, in dependence upon an IP address and a domain name of a computer in the network, a subnet, an IP zone, a domain name, a domain zone, and a region for the computer in the network.

4. The method of claim 1, wherein identifying a server closest to each client that will use the file further comprises:

if there is a server in the same subnet with the client, identifying the server in the same subnet with the client;

if there is no server in the same subnet with the client and if there is a server in the same IP zone with the client, identifying the server in the same IP zone with the client;

if there is no server in the same IP Zone with the client and if there is a server with the same domain name as the client, identifying the server with the same domain name as the client;

if there is no server with the same domain name as the client and if there is a server in the same domain zone with the client, identifying the server in the same domain zone with the client;

if there is no server in the same domain zone with the client and if there is a server in the same region with the client, identifying the server in the same region with the client; and if there is no server in the same subnet, IP zone, domain name, domain zone, or region with the client, identifying a server at random.

5. The method of claim 1, further comprising:

excluding from the identified closest servers any server having a count less than a predetermined minimum threshold count.

6. The method of claim 5 wherein:

the method further comprises for each identified closest server having a count greater than a predetermined maximum threshold count, identifying, for at least some of the clients that will use the file, an additional closest server within the topology of the network; and selecting for staging of the file one or more closest servers further comprises selecting for staging of the file one or more servers not excluded from the identified closest servers and also any identified additional closest server.

7. The method of claim 1 wherein:

the method further comprises providing a list of clients, each client on the list configured with an application associated with the file; and selecting, in dependence upon the topology of the network and the network locations of the computers in the network, one or more servers on which to stage the file for use by clients in the network further comprises selecting, in dependence upon the topology of the network, the list of clients, and the network locations of the computers in the network, one or more servers on which to stage the file for use by clients in the network.

8. An apparatus for staging a file within a distributed computing system, the distributed computing system comprising a plurality of computers coupled for data communications through a data communications network, the distributed computing system further comprising files of computer data and computer program instructions for use by the computers, the computers comprising clients that use the files and servers capable of functioning as staging locations for files for use by the computers in the network, the apparatus comprising a computer processor, a computer memory operatively coupled to the computer processor, the computer memory having disposed within it computer program instructions that cause the apparatus to:

define a topology of the network, the topology including a network hierarchy;

map each computer to a network location in the topology of the network;

select, in dependence upon the topology of the network and the network locations of the computers in the network, one or more servers on which to stage the file for use by clients in the network; and stage the file on the one or more selected servers, wherein selecting one or more servers on which to stage the file for use by clients in the network further comprises:

identifying, for each client, in a plurality of clients that will use the file, a closest server within the topology of the network;

counting a number of times that each identified closest server is identified as a closest server based on the plurality of clients that will use the file and the topology of the network; and selecting, for staging of the file, one or more closest servers based on the count of the number of times each identified closest server is identified as a closest server for clients in the plurality of clients that will use the file, wherein closest servers having higher counts are selected as closest servers.

9. The apparatus of claim 8 wherein defining a topology of the network further comprises:

specifying a hierarchy among a subnet, an IP zone, a domain name, a domain zone, and a region of the network.

10. The apparatus of claim 8 wherein mapping each computer to a network location in the topology of the network further comprises:

identifying, in dependence upon an IP address and a domain name of a computer in the network, a subnet, an IP zone, a domain name, a domain zone, and a region for the computer in the network.

11. The apparatus of claim 8, wherein identifying a server closest to each client that will use the file further comprises:

if there is a server in the same subnet with the client, identifying the server in the same subnet with the client;

if there is no server in the same subnet with the client and if there is a server in the same IP zone with the client, identifying the server in the same IP zone with the client;

if there is no server in the same IP Zone with the client and if there is a server with the same domain name as the client, identifying the server with the same domain name as the client;

if there is no server with the same domain name as the client and if there is a server in the same domain zone with the client, identifying the server in the same domain zone with the client;

if there is no server in the same domain zone with the client and if there is a server in the same region with the client, identifying the server in the same region with the client; and if there is no server in the same subnet, IP zone, domain name, domain zone, or region with the client, identifying a server at random.

12. The apparatus of claim 8, further comprising computer program instructions that cause the apparatus to:

exclude from the identified closest servers any server having a count less than a predetermined minimum threshold count.

13. The apparatus of claim 12 wherein:
the apparatus further comprises computer program instructions that cause the apparatus for each identified closest server having a count greater than a predetermined maximum threshold count, to identify, for at least some of the clients that will use the file, an additional closest server within the topology of the network; and
selecting, for staging of the file, one or more closest servers further comprises selecting for staging of the file one or more servers not excluded from the identified closest servers and also any identified additional closest server.

14. The apparatus of claim 8 wherein:
the apparatus further comprises computer program instructions that cause the apparatus to provide a list of clients, each client on the list configured with an application associated with the file; and
selecting, in dependence upon the topology of the network and the network locations of the computers in the network, one or more servers on which to stage the file for use by clients in the network further comprises selecting, in dependence upon the topology of the network, the list of clients, and the network locations of the computers in the network, one or more servers on which to stage the file for use by clients in the network.

15. A computer program product for staging a file within a distributed computing system, the distributed computing system comprising a plurality of computers coupled for data communications through a data communications network, the distributed computing system further comprising files of computer data and computer program instructions for use by the computers, the computers comprising clients that use the files and servers capable of functioning as staging locations for files for use by the computers in the network, the computer program product disposed in a non-transitory computer readable recordable medium, the computer program product comprising computer program instructions that cause at least one computing device in the distribute computing system to:
define a topology of the network, the topology including a network hierarchy;
map each computer to a network location in the topology of the network;
select, in dependence upon the topology of the network and the network locations of the computers in the network, one or more servers on which to stage the file for use by clients in the network; and
stage the file on the one or more selected servers, wherein selecting one or more servers on which to stage the file for use by clients in the network further comprises:
identifying, for each client, in a plurality of clients that will use the file, a closest server within the topology of the network;
counting a number of times that each identified closest server is identified as a closest server based on the plurality of clients that will use the file and the topology of the network; and
selecting, for staging of the file, one or more closest servers based on the count of the number of times each identified closest server is identified as a closest server for clients in the plurality of clients that will use the file, wherein closest servers having higher counts are selected as closest servers.

16. The computer program product of claim 15 wherein defining a topology of the network further comprises:
specifying a hierarchy among a subnet, an IP zone, a domain name, a domain zone, and a region of the network.

17. The computer program product of claim 15 wherein mapping each computer to a network location in the topology of the network further comprises:
identifying, in dependence upon an IP address and a domain name of a computer in the network, a subnet, an IP zone, a domain name, a domain zone, and a region for the computer in the network.

18. The method of claim 1, wherein:
determining for each closest server if a corresponding count is greater than a predetermined maximum threshold; and
for each closest server whose corresponding count is greater than the predetermined maximum threshold, selecting at least one additional closest server for staging of the file.

19. The apparatus of claim 8, wherein selecting one or more servers on which to stage the file for use by clients in the network further comprises:
determining for each closest server if a corresponding count is greater than a predetermined maximum threshold; and
for each closest server whose corresponding count is greater than the predetermined maximum threshold, selecting at least one additional closest server for staging of the file.

20. The computer program product of claim 15, wherein selecting one or more servers on which to stage the file for use by clients in the network further comprises:
determining for each closest server if a corresponding count is greater than a predetermined maximum threshold; and
for each closest server whose corresponding count is greater than the predetermined maximum threshold, selecting at least one additional closest server for staging of the file.

* * * * *